(12) United States Patent
Minezawa et al.

(10) Patent No.: US 8,959,890 B2
(45) Date of Patent: Feb. 24, 2015

(54) SCR THAWING CONTROL SYSTEM

(75) Inventors: Masanobu Minezawa, Fujisawa (JP); Keiichi Iida, Fujisawa (JP); Gouichi Akahoshi, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 97 days.

(21) Appl. No.: 13/697,928

(22) PCT Filed: May 16, 2011

(86) PCT No.: PCT/JP2011/061205
§ 371 (c)(1),
(2), (4) Date: Nov. 14, 2012

(87) PCT Pub. No.: WO2011/145567
PCT Pub. Date: Nov. 24, 2011

(65) Prior Publication Data
US 2013/0061574 A1    Mar. 14, 2013

(30) Foreign Application Priority Data

May 17, 2010    (JP) .................................. 2010-113748
May 25, 2010    (JP) .................................. 2010-119863

(51) Int. Cl.
*F01N 3/00*    (2006.01)
*F01N 3/10*    (2006.01)
(Continued)

(52) U.S. Cl.
CPC ............... *F01N 3/208* (2013.01); *F01N 11/00* (2013.01); *B01D 53/90* (2013.01); *B01D 53/9495* (2013.01); *F01N 2550/05* (2013.01); *F01N 2610/02* (2013.01); *F01N 2610/10* (2013.01); *F01N 2900/0421* (2013.01);
(Continued)

(58) Field of Classification Search
CPC . F01N 11/00; F01N 2550/05; F01N 2610/10; F01N 2900/0421; F01N 2900/1808; F01N 2900/1811; F01N 2610/02; F01N 3/208; B01D 53/90; B01D 2251/2067; Y02T 10/24
USPC ............................ 60/277, 286, 295, 303, 301
See application file for complete search history.

(56) References Cited

U.S. PATENT DOCUMENTS

2011/0027740 A1    2/2011    Peucat et al.

FOREIGN PATENT DOCUMENTS

| JP | 2000-303826 | 10/2000 |
| JP | 2008-248710 | 10/2008 |

(Continued)

OTHER PUBLICATIONS

Written Opinion of the International Searching Authority mailed Aug. 9, 2011 in corresponding International Application No. PCT/JP2011/061205.

(Continued)

*Primary Examiner* — Thomas Denion
*Assistant Examiner* — Diem Tran
(74) *Attorney, Agent, or Firm* — Staas & Halsey LLP.

(57) ABSTRACT

A selective catalytic reduction thawing control system that can distinguish between a thawing failure and a malfunction and can prevent a malfunction of a supply module ("SM") pump. The thawing control system includes a thawing control unit that detects a pressure inside the supply module when the SM pump is operated, and stops the operation of the SM pump and continues thawing of urea water when the pressure is less than a predetermined value.

3 Claims, 2 Drawing Sheets

(51) Int. Cl.
*F01N 3/20* (2006.01)
*F01N 11/00* (2006.01)
*B01D 53/90* (2006.01)
*B01D 53/94* (2006.01)

(52) U.S. Cl.
CPC .................. *F01N 2900/1808* (2013.01); *F01N 2900/1811* (2013.01); *Y02T 10/47* (2013.01); *Y02T 10/24* (2013.01); *B01D 2251/2067* (2013.01); *B01D 2257/404* (2013.01)
USPC .................... 60/277; 60/286; 60/301; 60/303

(56) References Cited

FOREIGN PATENT DOCUMENTS

| JP | 2009-185685 | | 8/2009 |
|----|-------------|---|--------|
| JP | 2010-059806 | * | 3/2010 |
| WO | WO 2009/112516 | | 9/2009 |

OTHER PUBLICATIONS

Patent Abstracts of Japan, Publication No. 2000-303826, Published Oct. 31, 2000.
Patent Abstracts of Japan, Publication No. 2008-248710, Published Oct. 16, 2008.
Patent Abstracts of Japan, Publication No. 2009-185685, Published Aug. 20, 2009.
International Search Report of PCT/JP2011/061205 mailed Aug. 9, 2011.
English translation of Japanese Published Patent Application No. 2008-248710 published Oct. 16, 2008.
English translation of Japanese Published Patent Application No. 2009-185685 published on Aug. 20, 2009.
Patent Abstracts of Japan, Japanese Published Patent Application No. 2008-248710, published Oct. 16, 2008.
Patent Abstracts of Japan, Japanese Published Patent Application No. 2009-185685, published Aug. 20, 2009.

* cited by examiner

SCR THAWING CONTROL SYSTEM

CROSS-REFERENCE TO RELATED APPLICATIONS

This application claims the foreign priority benefit of Japanese Application No. 2010-113748 filed May 17, 2010 and Japanese Application No. 2010-119863 filed May 25, 2012, the contents of both of which are incorporated herein by reference, and both of which serve as priority for PCT Application No. JP2011/061205 filed May 16, 2011.

TECHNICAL FIELD

The present invention relates to a Selective Catalytic Reduction ("SCR") thawing control system for thawing frozen urea water.

BACKGROUND ART

As an exhaust gas purification system for purifying NOx in exhaust gas of a diesel engine, an SCR (Selective Catalytic Reduction) system using an SCR device has been developed.

The SCR system supplies urea water to an exhaust gas upstream of SCR, generates ammonia by the heat of the exhaust gas, and reduces and purifies NOx on an SCR catalyst by the ammonia (see, for example, Patent Document 1).

However, there is a problem in that urea water cannot be supplied in cold weather because the urea water is frozen at about −10° C. For this reason, the SCR system is mounted with an SCR thawing control system that supplies engine cooling water to a urea water supply system in cold weather and performs a thawing control for thawing frozen urea water.

When any one of a tank temperature inside a urea tank for storing urea water, a temperature inside a urea pipe between the urea tank and a dosing valve for injecting urea water on an upstream side of an SCR device, and an SM (Supply Module) temperature inside a supply module connected to the urea pipe is less than a predetermined threshold value, a conventional SCR thawing control system determines that the urea water has been frozen, and performs a thawing control. Further, in general, because there is no sensor for detecting the temperature inside the urea pipe, an ambient temperature is regarded as the temperature inside the urea pipe.

When the tank temperature or the SM temperature is greater than or equal to the threshold value and a set time according to an ambient temperature has elapsed, the conventional SCR thawing control system determines that thawing has been completed, and operates an SM pump of the supply module to fill urea water into the urea pipe, maintain a pressure thereof at a predetermined value, and inject urea water from the dosing valve (or prepare to be able to inject urea water from the dosing valve).

PRIOR ART DOCUMENTS

Patent Document 1: Japanese Patent Application Publication No. 2000-303826

However, the tank temperature or the SM temperature is detected by temperature sensors provided in the urea tank or the supply module. Therefore, even when the detection value is greater than or equal to the threshold value, urea water may remain frozen in a portion spaced apart from the temperature sensors (a connection portion between the supply module and the urea pipe, and the like) because thawing is insufficient in the portion.

For example, when urea water remains frozen at a portion connected to the urea pipe on a suction side of the SM pump, the pressure does not rise due to a frozen matter, or the pressure becomes a high pressure.

When the pressure does not rise, the pump operates at the maximum power (idling). At this time, ice crystals or unthawable urea water flows into the pump, causing a load on the pump. Further, when the pressure becomes a high pressure, there is a possibility that the pump will malfunction (malfunction caused by an abnormally high pressure).

In this manner, the conventional SCR thawing control system may not detect a thawing failure. When time taken to determine the malfunction is shortened, the conventional SCR thawing control system warns of the malfunction by an abnormality signal just due to insufficient thawing (system stop). Further, when the time taken to determine the malfunction is lengthened, the pump malfunctions. The lifetime of the pump is shortened although the pump does not malfunction.

SUMMARY OF THE INVENTION

Therefore, an object of the present invention is to provide an SCR thawing control system that can distinguish between a thawing failure and a malfunction and can prevent a malfunction of an SM pump.

The present invention has been made in order to achieve the above object, and includes an SCR thawing control system, which thaws urea water of a selective catalytic reduction device when the urea water is frozen, and operates a supply module pump of a supply module after the thawing to inject the thawed urea water from a dosing valve, wherein the SCR thawing control system includes a thawing control unit that detects a pressure inside the supply module when the supply module pump is operated, and stops the operation of the supply module pump when the pressure is less than a predetermined value.

The thawing control unit can detect an ambient temperature when the pressure inside the supply module is less than the predetermined value, and stops the operation of the supply module pump when the detected ambient temperature is lower than a predetermined temperature.

The thawing control unit continues thawing of the urea water while stopping the operation of the supply module pump, detects a pressure inside the supply module again when the thawing is continued for a predetermined time, and warns of a malfunction when the pressure is less than the predetermined value.

The thawing control unit can warn of a malfunction when detecting a predetermined number of times that the pressure inside the supply module is less than the predetermined value.

According to the present invention, the thawing failure and the malfunction can be distinguished from each other, and the malfunction of the SM pump can be prevented.

DETAILED DESCRIPTION

Hereinafter, preferred embodiments of the present invention will be described with reference to the accompanying drawings.

First, an SCR system mounted on a vehicle will be described.

Figure 1:
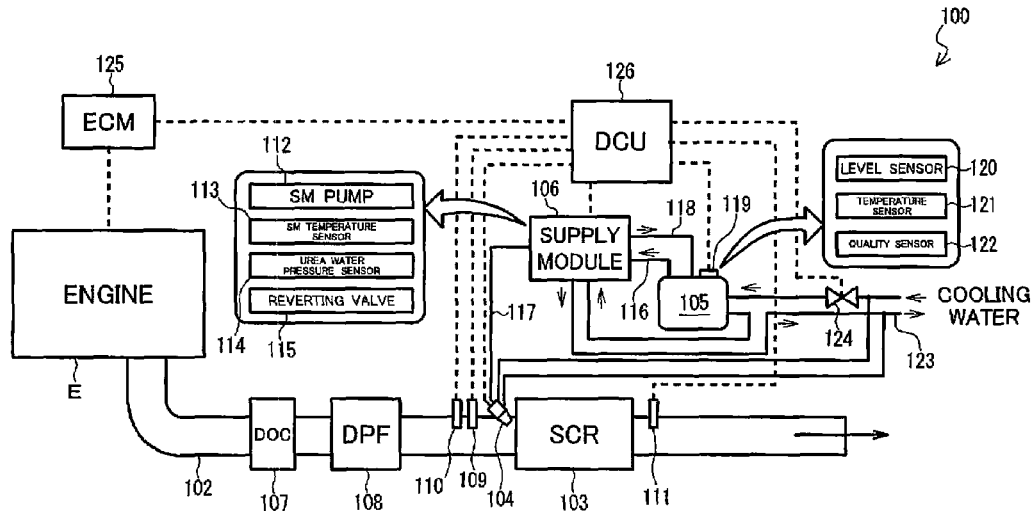
FIG. 1 is a schematic view showing an SCR system to which the present invention is applied.

As shown in FIG. 1, an SCR system 100 mainly includes an SCR device 103 provided at an exhaust pipe 102 of an engine E, a dosing valve (urea injection device, dosing module) 104 for injecting urea water on an upstream side of the SCR device 103 (upstream side of exhaust gas), a urea tank 105 for storing urea water, a supply module 106 for supplying the urea water stored in the urea tank 105 to the dosing valve 104, and the DCU 126 for controlling the dosing valve 104, the supply module 106, and the like.

At the exhaust pipe 102 of the engine E, a DOC (Diesel Oxidation Catalyst) 107, a DPF (Diesel Particulate Filter) 108, and the SCR device 103 are sequentially arranged from the upstream side to the downstream side of exhaust gas. The DOC 107 generates NO2 by oxidizing NO in exhaust gas exhausted from the engine E, and increases a denitrification efficiency in the SCR device 103 by controlling a ratio of NO to NO2 in the exhaust gas. Further, the DPF 108 traps Particulate Matter (PM) in the exhaust gas.

The dosing valve 104 is provided at the exhaust pipe 102 on the upstream side of the SCR device 103. The dosing valve 104 is configured such that an injection nozzle is provided at a cylinder filled with high-pressure urea water, and a valve body plugging the injection nozzle is attached to a plunger. By pulling up the plunger by electrifying a coil, the valve body is separated from the injection nozzle, so that the urea water is injected. When electrifying the coil is stopped, the plunger is pulled down by an internal spring force and thus the valve body plugs the injection nozzle, so that the injection of the urea water is stopped.

An exhaust gas temperature sensor 109 for measuring a temperature of the exhaust gas in an inlet of the SCR device 103 (SCR inlet temperature) is provided at the exhaust pipe 102 on an upstream side of the dosing valve 104. Further, an upstream side NOx sensor 110 for detecting a concentration of NOx in the upstream side of the SCR device 103 is provided on the upstream side of the SCR device 103 (herein, an upstream side of the exhaust gas temperature sensor 109), and a downstream side NOx sensor 111 for detecting a concentration of NOx in the downstream side of the SCR device 103 is provided on the downstream side of the SCR device 103.

The supply module 106 includes an SM pump 112 for pumping the urea water, an SM temperature sensor 113 for measuring a temperature of the supply module 106 (temperature of the urea water flowing through the supply module 106), a urea water pressure sensor 114 for measuring a pressure of the urea water in the supply module 106 (pressure in a discharge side of the SM pump 112), and a reverting valve 115 for switching a flow passage of the urea water to switch whether or not to supply the urea water from the urea tank 105 to the dosing valve 104 or return the urea water inside the dosing valve 104 to the urea tank 105. Herein, when the reverting valve 115 is turned off, the urea water from the urea tank 105 is supplied to the dosing valve 104; and when the reverting valve 115 is turned on, the urea water inside the dosing valve 104 is returned to the urea tank 105.

When the reverting valve 115 is switched to supply the urea water to the dosing valve 104, the supply module 106 suctions the urea water inside the urea tank 105 by the SM pump 112 through a liquid feed line (suction line) 116, supplies the urea water to the dosing valve 104 through a pump line (pressure line) 117, and returns surplus urea water to the urea tank 105 through a recovery line (back line) 118.

The urea tank 105 is provided with an SCR sensor 119. The SCR sensor 119 includes a level sensor 120 for measuring a liquid surface height (level) of the urea water inside the urea tank 105, a temperature sensor 121 for measuring a temperature of the urea water inside the urea tank 105, and a quality sensor 122 for measuring a quality of the urea water inside the urea tank 105. The quality sensor 122 detects the quality of the urea water inside the urea tank 105 by detecting the concentration of the urea water or detecting whether or not a heterogeneous mixture is mixed in the urea water, for example, from a propagation speed of an ultrasonic wave or an electrical conductivity.

A cooling water line 123 for circulating cooling water for cooling the engine E (engine cooling water) is connected to the urea tank 105 and the supply module 106. The cooling water line 123 performs heat exchange between the cooling water flowing through the urea tank 105 into the cooling water line 123 and the urea water inside the urea tank 105. Likewise, the cooling water line 123 performs heat exchange between the cooling water flowing through the supply module 106 into the cooling water line 123 and the urea water inside the supply module 106.

The cooling water line 123 is provided with a tank heater valve (coolant valve) 124 for switching whether or not to supply the cooling water to the urea tank 105 and the supply module 106. In addition, although the cooling water line 123 is also connected to the dosing valve 104, the cooling water is supplied to the dosing valve 104 regardless of the on/off of the tank heater valve 124. Further, although not shown in FIG. 1 for simplicity, the cooling water line 123 is disposed along the liquid feed line 116, the pump line 117, and the recovery line 118 through which the urea water flows.

Figure 2:
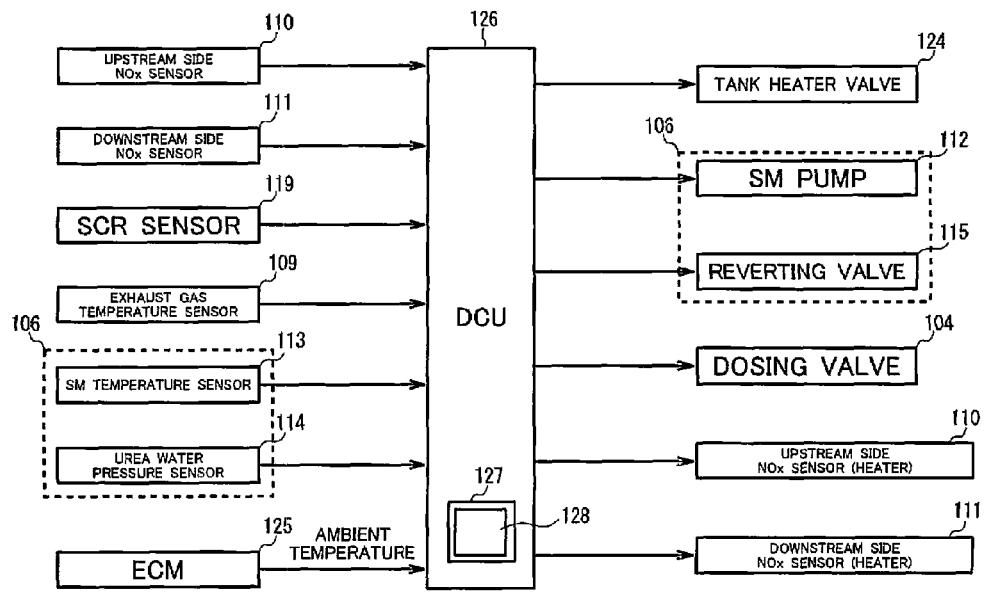
FIG. 2 is a diagram showing an input/output configuration of a Dosing Control Unit ("DCU").

FIG. 2 shows an input/output configuration diagram of the DCU 126.

As shown in FIG. 2, an input signal line from an ECM (Engine Control Module) 125 controlling the upstream side NOx sensor 110, the downstream side NOx sensor 111, the SCR sensor 119 (level sensor 120, temperature sensor 121, quality sensor 122), the exhaust gas temperature sensor 109, the SM temperature sensor 113 and the urea water pressure sensor 114 of the supply module 106, and the engine E is connected to the DCU 126. Signals of the ambient temperature and engine parameters (the number of rotations of the engine, and the like) are input from the ECM 125.

Further, output signal lines to the tank heater valve 124, the SM pump 112 and the reverting valve 115 of the supply module 106, the dosing valve 104, a heater of the upstream side NOx sensor 110, and a heater of the downstream side NOx sensor 111 are connected to the DCU 126. Further, the input/output of signals between the DCU 126 and the respective members may be any one of the input/output through separate signal lines and the input/output through a CAN (Controller Area Network).

The DCU 126 estimates an amount of NOx in the exhaust gas based on the engine parameter signals from the ECM 125 and the temperature of the exhaust gas from the exhaust gas temperature sensor 109, and determines an amount of urea water to be injected from the dosing valve 104 based on the estimated amount of NOx in the exhaust gas. In addition, when the determined amount of urea water is injected by the dosing valve 104, the DCU 126 controls the dosing valve 104 based on the detection value of the upstream side NOx sensor 110 to adjust the amount of urea water to be injected from the dosing valve 104.

The SCR system 100 includes an SCR thawing control system 127 that, when urea water is frozen, thaws the frozen urea water and then operates the SM pump 112 of the supply module 106 to inject the thawed urea water from the dosing valve 104 (prepare to be able to inject the thawed urea water from the dosing valve 104).

The SCR thawing control system 127 refers to the temperature of urea water inside the urea tank 105 detected by the temperature sensor 121 of the SCR sensor 119 (tank temperature), the temperature inside the liquid feed, pump and recovery lines 116, 117 and 118 (the ambient temperature received from the ECM 125 is regarded as the temperature inside the liquid feed, pump and recovery lines 116, 117 and 118), and the temperature of the supply module 106 detected by the SM temperature sensor 113 (SM temperature), determines that the urea water is frozen when any one of these temperatures is less than a threshold value (for example, a melting point of the urea water), turns on (open) the tank heater valve 124, and supplies the cooling water from the engine E through the cooling water line 123 to the urea tank 105, the liquid feed, pump and recovery lines 116, 117 and 118, and the supply module 106 to start a thawing control for thawing the frozen urea water.

When the tank temperature or the SM temperature is greater than or equal to a threshold value and a predetermined time according to the ambient temperature has elapsed, the SCR thawing control system 127 determines that the thawing has been completed, and operates the SM pump 112 of the supply module 106 to fill urea water into the pump line 117 (urea pipe) and maintain the pressure detected by the urea water pressure sensor 114 at a predetermined value. When the pressure is maintained at the predetermined value, the SCR thawing control system 127 ends the thawing control. Accordingly, the SCR thawing control system 127 injects the urea water from the dosing valve 104 (or prepares to be able to inject the urea water from the dosing valve 104).

The SCR thawing control system 127 of the present invention includes a thawing control unit 128 that detects a pressure inside the supply module (pressure detected by the urea water pressure sensor 114) when the SM pump 112 is operated, and stops the operation of the SM pump 112 when the pressure is less than a predetermined value (when the pressure does not maintain a predetermined value). The thawing control unit 128 is mounted in the DCU 126.

Further, as the cases where the pressure detected by the urea water pressure sensor 114 does not maintain the predetermined value, there are a high-pressure abnormality and a low-pressure abnormality. The case where the pressure does not rise even after the lapse of a predetermined time from the start of urea water filling corresponds to the low-pressure abnormality, and the case where the pressure rises rapidly after the start of the urea water filling corresponds to the high-pressure abnormality. That is, the high-pressure abnormality is detected within a relatively short time from the start of urea water filling, and the low-pressure abnormality is detected after the lapse of a predetermined time.

As an example of the high-pressure abnormality, there may be considered the case where urea water is frozen at a connection portion between the recovery line 118 and the supply module 106 and the pressure detected by the urea water pressure sensor 114 becomes a high pressure. Further, as an example of the low-pressure abnormality, there may be considered the case where urea water is frozen at a connection portion between the liquid feed line 116 and the supply module 106 and the pressure detected by the urea water pressure sensor 114 does not rise.

The thawing control unit 128 detects an ambient temperature when the pressure detected by the urea water pressure sensor 114 does not maintain the predetermined value, and stops the operation of the SM pump 112 when the detected ambient temperature is low (is less than a threshold value (for example, a melting point of the urea water)).

Further, the thawing control unit 128 continues thawing of the urea water while stopping the operation of the SM pump 112, detects a pressure inside the supply module 106 again when the thawing is continued for a predetermined time, and warns of a malfunction when the pressure is less than the predetermined value.

In addition, the thawing control unit 128 warns of a malfunction when detecting a predetermined number of times that the pressure inside the supply module 106 is less than the predetermined value.

Figure 3:
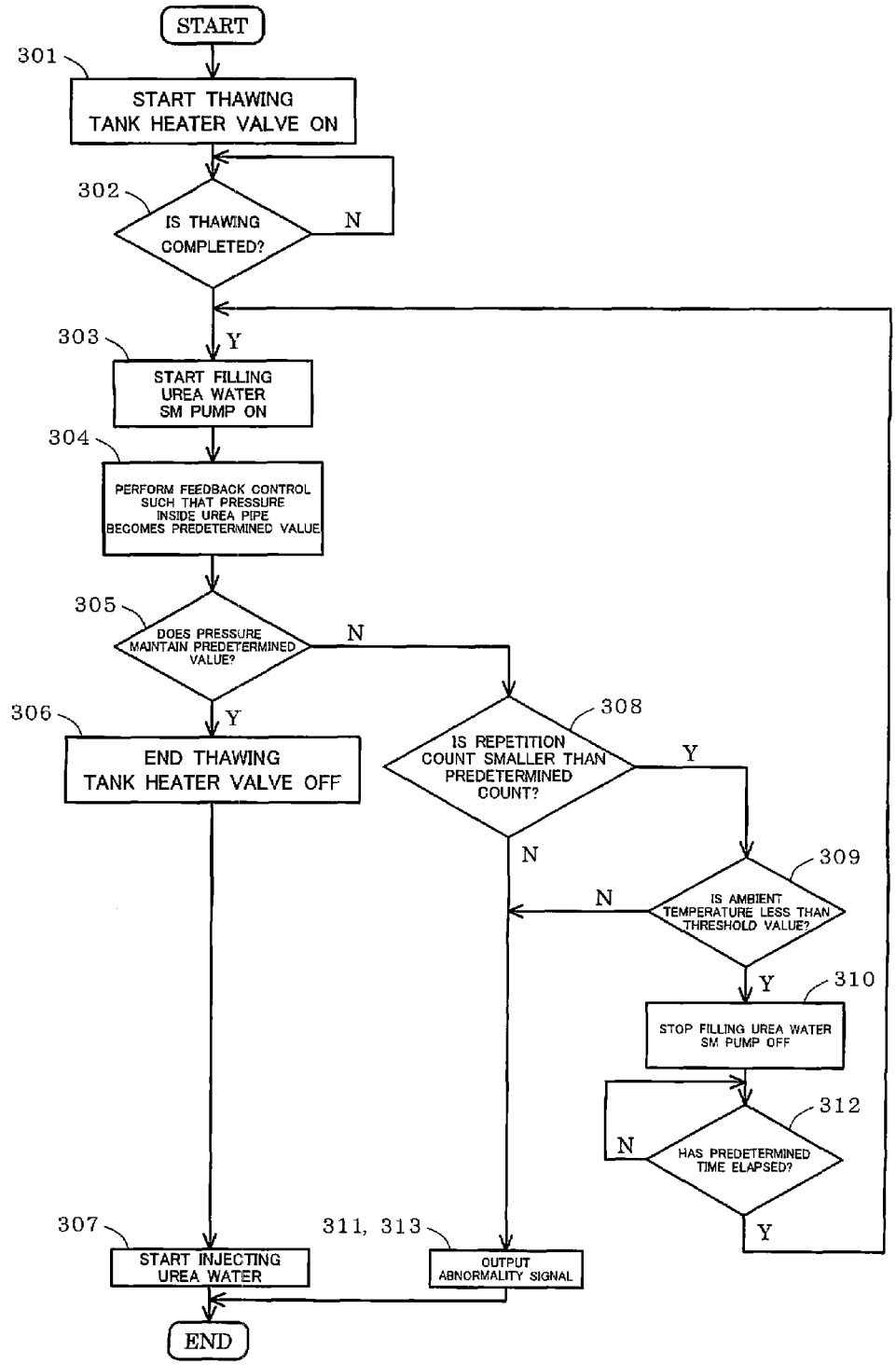
FIG. 3 is a flowchart showing an operation of an SCR thawing control system according to one embodiment of the present invention.

A detailed operation of the thawing control unit 128 will be described with reference to FIG. 3, together with the operation of the SCR thawing control system 127.

The SCR thawing control system 127 determines whether or not a thawing control condition is satisfied after a key-on. Whether or not the thawing control condition is satisfied is determined according to whether or not any one of the temperature of urea water inside the urea tank 105 detected by the temperature sensor 121 (tank temperature), the temperature inside the liquid feed, pump and recovery lines 116, 117 and 118, and the temperature of the supply module 106 detected by the SM temperature sensor 113 (SM temperature) is less than a predetermined threshold value. Further, in general, because there is no sensor for detecting the temperature inside the liquid feed, pump and recovery lines 116, 117 and 118, the ambient temperature received from the ECM 125 is regarded as the temperature inside the liquid feed, pump and recovery lines 116, 117 and 118.

When any one of these temperatures is less than the threshold value, the SCR thawing control system 127 determines that the urea water is frozen, turns on the tank heater valve 124, supplies the cooling water from the engine E through the cooling water line 123 to the urea tank 105, the liquid feed, pump and recovery lines 116, 117 and 118, and the supply module 106, and starts a thawing control for thawing the frozen urea water (step 301).

When the thawing of the urea water has been completed by the thawing control (step 302), the SCR thawing control system 127 operates (ON) the SM pump 112, suctions urea water inside the urea tank 105 through the liquid feed line 116, and supplies the urea water to the dosing valve 104 through the pump line 117 to fill the urea water into the pump line 117 (step 303). The SCR thawing control system 127 raises the pressure detected by the urea water pressure sensor 114 and performs a feedback control of the SM pump 112 such that the pressure becomes a predetermined value (step 304). Herein, the completion of the thawing is determined according to whether or not the tank temperature or the SM temperature is greater than or equal to a threshold value and a set time according to the ambient temperature has elapsed.

Subsequently, when the pressure detected by the urea water pressure sensor 114 maintains the predetermined value (step 305), the SCR thawing control system 127 turns off (close) the tank heater valve 124 to end the thawing control (step 306). Accordingly, preparation for injecting the urea water from the dosing valve 104 is completed, and the urea water can be injected (step 307).

On the other hand, when determining in step 305 that the pressure detected by the urea water pressure sensor 114 does not maintain the predetermined value, the thawing control unit 128 stores a repetition count of the process and determines whether or not the repetition count is less than a predetermined count (step 308).

When determining in step 308 that the repetition count is less than the predetermined count, the thawing control unit 128 determines whether or not the ambient temperature is less than a threshold value (step 309). When the ambient temperature is less than the threshold value, the thawing control unit 128 determines that the thawing has failed, stops the operation of the SM pump 112, stops the filling of the urea water into the pump line 117 (step 310), and continues the thawing of the urea water. On the other hand, when the ambient temperature is greater than or equal to the threshold value, it is determined that the thawing of the urea water has been sufficiently performed. In this case, since there is a possibility that a certain abnormality has occurred, the thawing control unit 128 outputs an abnormality signal to warn of a malfunction (step 311).

When the thawing is continued, the thawing control unit 128 determines completion of the thawing (step 312). At this time, since the thawing completion condition used in step 302 is already satisfied, the thawing completion cannot be determined in the same condition. Thus, as the thawing completion condition of step 312, it is determined according to whether or not a preset time (predetermined time) has elapsed after the stop of the operation of the SM pump 112. The preset time may refer to a map that is pre-created such that it varies according to the repetition count and the detected pressure. For example, the map is created such that the set time increases with an increase in the repetition count so that the thawing is sufficiently progressed (the high-pressure case is set to have a longer set time than the low-pressure case because its pump malfunction probability increases). After completion of the thawing, the urea water is sufficiently thawed by repeating the above steps 303, 304, 305, 308, 309, and 310.

When determining in step 308 that the repetition count is greater than or equal to the predetermined count, there is a possibility that a certain abnormality has occurred. Therefore, the thawing control unit 128 outputs an abnormality signal to warn of a malfunction (step 313).

In this manner, according to the present invention, the SCR thawing control system 127 includes the thawing control unit 128 that detects a pressure inside the supply module 106 when the SM pump 112 is operated, and stops the operation of the SM pump 112 when the pressure is less than the predetermined value. Therefore, the thawing failure and the malfunction can be distinguished from each other, and it is possible to prevent the abnormality signal from being output even when the abnormality has not occurred. Further, since the operation of the SM pump 112 is stopped when the pressure is less than the predetermined value, the malfunction of the SM pump 112 can be prevented.

After continuing the urea water thawing for a predetermined time, the thawing control unit 128 operates the SM pump 112 again and detects a pressure inside the supply module 106. When the pressure is less than the predetermined value, these are repeated by the predetermined count. Therefore, the frozen urea water can be securely thawed by retrying (resuming) the thawing.

In addition, since the thawing control unit 128 warns of a malfunction when the repetition count is greater than or equal to the predetermined count, a thawing failure and a malfunction can be distinguished from each other, and the corresponding control can be performed.

The invention claimed is:

1. A selective catalytic reduction thawing control system, which thaws urea water of a selective catalytic reduction device when the urea water is frozen, and operates a pump of a supply device after the thawing to inject the thawed urea water from a dosing valve, comprising:
   a thawing control device that detects a pressure inside the supply device when the pump is operated, and stops the operation of the pump when the pressure is less than a predetermined value,
   wherein the thawing control device continues the thawing of the urea water while stopping the operation of the pump, detects the pressure inside the supply device again when the thawing is continued for a predetermined time, and warns of a malfunction when the pressure is less than the predetermined value.

2. The selective catalytic reduction thawing control system according to claim 1, wherein the thawing control device detects an ambient temperature when the pressure inside the supply device is less than the predetermined value, and stops the operation of the pump when the detected ambient temperature is lower than a predetermined temperature.

3. The selective catalytic reduction thawing control system according to claim 1, wherein the thawing control device warns of the malfunction when detecting a predetermined number of times that the pressure inside the supply device is less than the predetermined value.

* * * * *